United States Patent Office.

JACOB W. SPEYER, OF HAMBURG, GERMANY.

Letters Patent No. 103,384, dated May 24, 1870.

IMPROVEMENT IN SIZING COTTON AND OTHER FABRICS.

The Schedule referred to in these Letters Patent and making part of the same.

*To all whom it may concern:*

Be it known that I, JACOB W. SPEYER, of Hamburg, Germany, have invented a new and Improved Compound for Sizing Cotton and other Textile Fabrics; and I do hereby declare the following to be a full, clear, and exact description thereof, which will enable those skilled in the art to make and use the same.

This invention relates to a compound which is obtained with the best advantage by subjecting the earths and minerals obtained from the mines in Stassfurt, in the kingdom of Prussia, to a washing and separating process.

These earths and minerals are chiefly composed of sulphates and muriates of potash and magnesia, and, in order to obtain my sizing compound, I grind or pulverize said minerals in suitable mills, and then I dissolve the same in boiling water. When this solution is left to cool, I obtain crystals which contain chiefly muriate and sulphate of potash, and which are used for other purposes.

The remaining liquid I pass through a filter, and, by this operation, I obtain a compound consisting chiefly of sulphate of magnesia, which I have found to be of great value for sizing cotton and other textile fabrics.

In applying it for this purpose, I first pass the yarn or fabrics through a solution of the sulphate of magnesia, of about two pounds of the salt in about ten pounds of water, and then treat them with milk of lime, or a solution of muriate of lime, or muriate of baryta, or muriate of strontia, to impart to them gloss and weight.

The milk of lime, or other solutions, are used in such a style of concentrations as the nature of the material may demand.

What I claim as new, and desire to secure by Letters Patent, is—

1. A sizing compound, substantially as described.
2. The within-described process for producing a sizing compound, substantially such as herein specified, by treating the minerals obtained from the mines of Stassfurt in the manner set forth.

This specification signed by me this 29th day of November, 1869.

J. W. SPEYER.

Witnesses:
W. HAUFF,
E. F. KASTENHUBER.